March 12, 1929.  A. H. STROUT  1,704,873
HEATING UNIT FOR MOTOR VEHICLES
Filed March 2, 1928   2 Sheets-Sheet 1
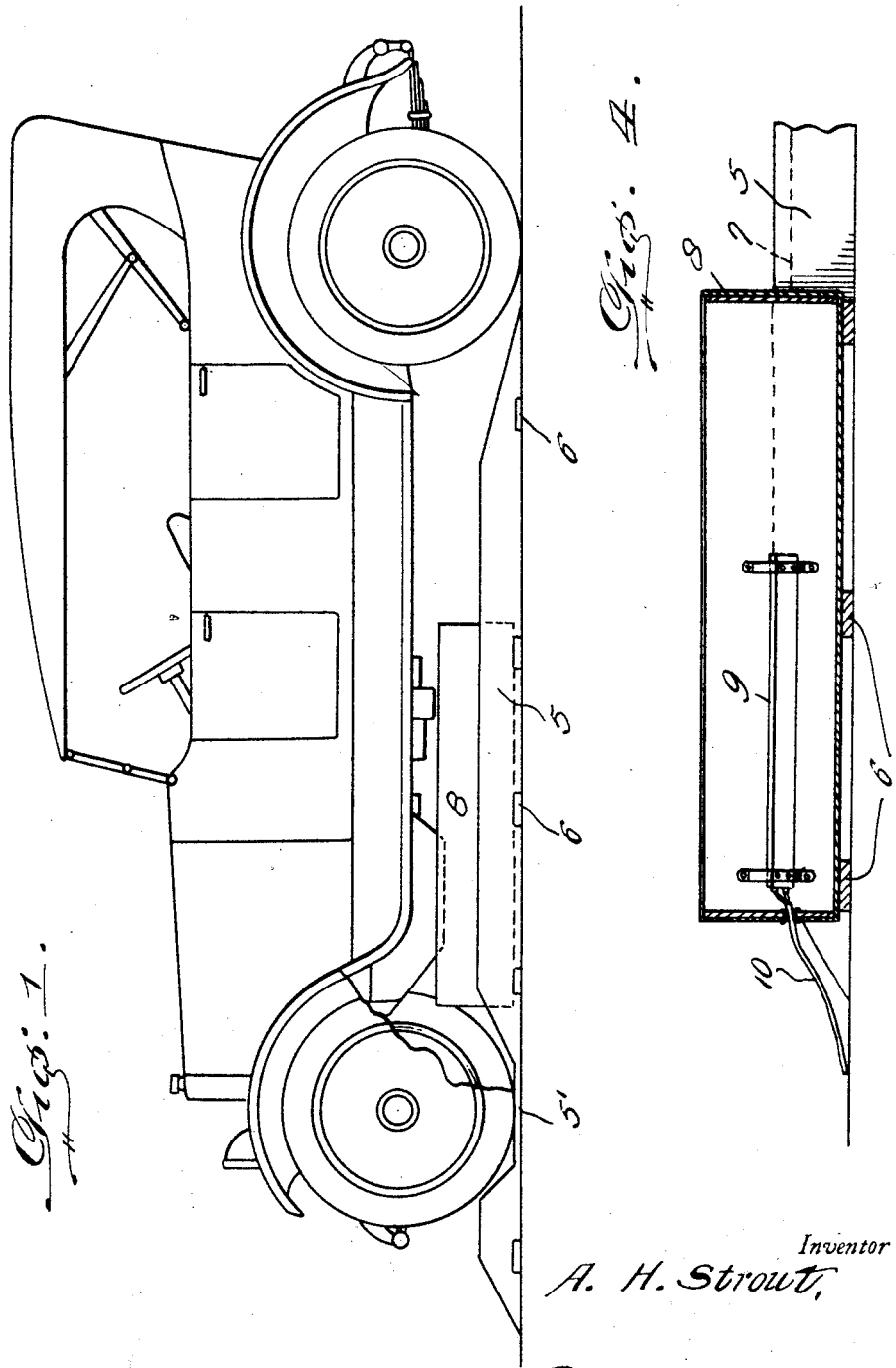
Inventor
A. H. Strout,
By Clarence A. O'Brien
Attorney March 12, 1929.　　A. H. STROUT　　1,704,873
HEATING UNIT FOR MOTOR VEHICLES
Filed March 2, 1928　　2 Sheets-Sheet 2
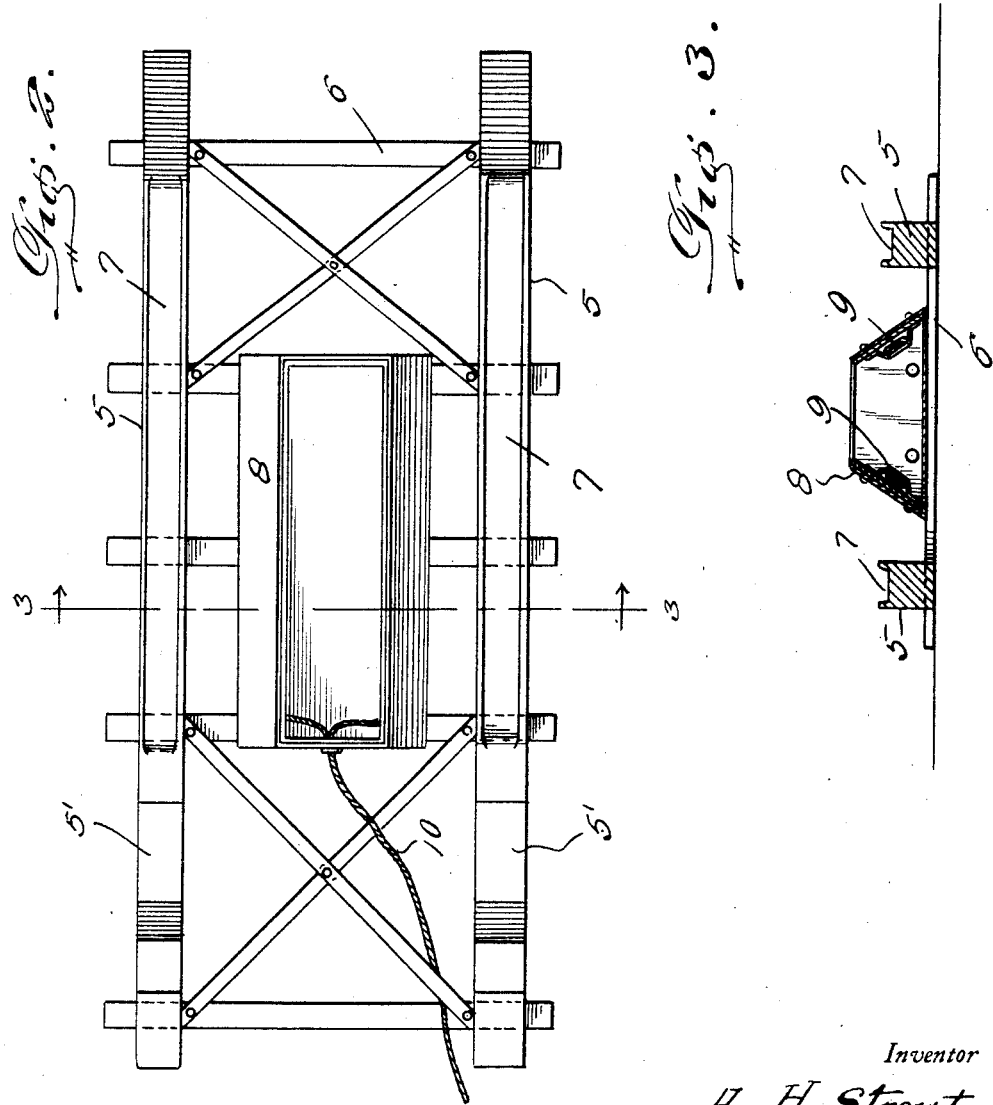
Inventor
A. H. Strout,
By Clarence A. O'Brien
Attorney Patented Mar. 12, 1929.

1,704,873

UNITED STATES PATENT OFFICE.

ARCHIBALD HILBOURN STROUT, OF WATERVILLE, MAINE.

HEATING UNIT FOR MOTOR VEHICLES.

Application filed March 2, 1928. Serial No. 258,548.

This invention relates to new and useful improvements in motor vehicle heating units and aims to provide a device for disposition within a garage whereby the machine crank case, transmission housing, universal joint and other parts may be thoroughly heated prior to the removal of the car from the garage, and in some instances even prior to the starting of the machine so that congealed oil and grease as well as frozen condensation within the elements may be properly thawed so that the car will readily start, even during the coldest weather.

Furthermore the provision of a device of this character will act as a means for thawing frozen radiators or to prevent the freezing of the same when the car is left in the garage over night with little or insufficient anti-freezing solution. In order to bring about this result it will, of course be necessary that the heater be maintained in "on" condition until the car is taken from the garage.

A further and important object resides in the provision of means whereby the car will be automatically manipulated into position so that the crank case transmission housing and the like will be disposed directly above the heater, so that the proper results may be attained.

In the drawings, wherein for the purpose of illustration is shown the preferred embodiment of my invention:

Figure 1 is a side elevation of a conventional automobile arranged in position over my heating device.

Figure 2 is a top plan view of the heating device.

Figure 3 is a detail transverse section taken substantially upon the line 3—3 of Figure 2, and Figure 4 is a detail longitudinal section of the heating pan per se.

Now having particular reference to the drawings my novel device consists of a pair of spaced parallel track bars 5—5, interconnected at spaced points throughout their length by cross members 6, the opposite ends of these track bars being bevelled, so as to permit the wheels of the automobile to easily run upwardly and downwardly thereon. The major length of the rails 5—5 are formed with channels 7—7 in their upper surfaces to act as a guide means for the automobile wheels, so as to preclude any liability of the machine going off of the edges of said rails.

In spaced relation with the forward ends of the rails 5—5 the same are formed with pits 5'—5', the end walls of which are bevelled as disclosed in Figure 1, and within which pits the front wheels of the machine will drop after the machine has been driven forwardly upon the rail.

Supported longitudinally between the said rails 5—5 directly in back of the rail pit 5'—5' is an elongated metallic pan 8, open at its top side and being formed with inclined side walls as clearly disclosed in Figures 2 and 3. Upon the interior of this pan 8 is a suitable non-conducting lining, while arranged within the pan and upon the opposite side walls are elongated electrical heating units 9—9 from which extend an electric cable 10 whereby the units may be connected to a storage battery or the house current.

It will be noted that the arrangement of the pan 8 directly in back of the pits within the rails 5—5 will cause the crank case transmission housing and other highly oiled parts of the machine to be disposed directly above the pan so that the full effect of the heat generated by the heating units 9—9 will be directed against these parts for thawing out congealed oil, grease and frozen condensation that may have found its way to said parts. Furthermore, the heat from the device will reach the machine radiator for thawing any of the water that may be frozen or for at least heating the water to a perceptible extent, all resulting in the easy starting of the machine.

Even though I have herein shown and described the invention as consisting of certain detail structural elements and as including a heat generating pan supported between a pair of track rails, it is nevertheless to be understood that the rails may be dispensed with and other changes made, without affecting the spirit and scope of the appended claims.

Having thus described my invention, what I claim as new is:

1. In a heating device for the power plant of an automobile, an elongated pan adapted for longitudinal arrangement beneath the power plant of the machine, said pan being open at its top side, electrical heating elements arranged upon the inner faces of the side walls of said pan, and means associated with the pan whereby the machine may be driven into position to arrange the power plant directly over said pan.

2. In a heating device for the power plant of an automobile, an elongated pan adapted for longitudinal arrangement beneath the power plant of the machine, said pan being open at its top side, electrical heating elements arranged upon the inner faces of the side walls of said pan, means associated with the pan whereby the machine may be driven into position to arrange the power plant directly over said pan, said means consisting of a pair of parallel track rails arranged at opposite sides of the pan and associated therewith as a unit.

3. In a heating device for the power plant of an automobile, a pair of spaced parallel track rails for the wheels of the machine, and a heating unit arranged between the rails for disposition beneath the power plant when the machine has been driven forwardly upon said rails.

4. In a heating device for the power plant of an automobile, a pair of spaced parallel track rails for the wheels of the machine, and a heating unit arranged between the rails for disposition beneath the power plant when the machine has been driven forwardly upon said rails, said heating unit consisting of a housing open at its top side and having inclined side walls, and a pair of elongated electrical heating units arranged upon the inner faces of the side walls of said pan.

5. In a heating device for the power plant of an automobile, a pair of spaced parallel tracks on which the wheels of an automobile are adapted to travel, a heating unit arranged between the tracks, in such a manner as to provide a unitary structure, said heating unit being adapted for disposition beneath the power plant of the automobile when the latter is driven on said track, said track being formed with pits for receiving the wheels of the automobile to cause the power plant to be disposed directly with the heater.

In testimony whereof I affix my signature.

ARCHIBALD HILBOURN STROUT.